(12) United States Patent
Shaftel

(10) Patent No.: US 7,346,550 B2
(45) Date of Patent: Mar. 18, 2008

(54) PERSONALIZED ELECTRONIC-COMMERCE PET SHOP

(76) Inventor: Farell Shaftel, 125 Route 10 East, Suite 316, Whippany, NJ (US) 07981

( * ) Notice: Subject to any disclaimer, the term of this patent is extended or adjusted under 35 U.S.C. 154(b) by 602 days.

(21) Appl. No.: 10/234,585

(22) Filed: Sep. 4, 2002

(65) Prior Publication Data
US 2003/0050857 A1 Mar. 13, 2003

Related U.S. Application Data

(60) Provisional application No. 60/317,527, filed on Sep. 7, 2001.

(51) Int. Cl.
*G06Q 30/00* (2006.01)
(52) U.S. Cl. ....................................... 705/26
(58) Field of Classification Search ................ 705/26, 705/27, 10, 14
See application file for complete search history.

(56) References Cited

U.S. PATENT DOCUMENTS

| 6,216,111 | B1* | 4/2001 | Walker et al. ................. 705/14 |
| 6,453,302 | B1* | 9/2002 | Johnson et al. ............... 705/27 |
| 2002/0072984 | A1* | 6/2002 | Rothman et al. ............. 705/26 |
| 2002/0116266 | A1* | 8/2002 | Marshall ....................... 705/14 |
| 2002/0156678 | A1* | 10/2002 | Adams .......................... 705/14 |
| 2003/0126007 | A1* | 7/2003 | Pavone et al. ................ 705/10 |
| 2004/0155109 | A1* | 8/2004 | Kenney et al. ........ 235/462.45 |
| 2005/0267778 | A1* | 12/2005 | Kazman ........................ 705/1 |
| 2006/0092966 | A1* | 5/2006 | Sitnik et al. ................ 370/463 |

* cited by examiner

*Primary Examiner*—Ronald Laneau
(74) *Attorney, Agent, or Firm*—Law Offices of Rita C. Chipperson, P.C.; Rita C. Chipperson, Esq.

(57) ABSTRACT

A personalized electronic commerce marketing system wherein in-person sales representatives personally visit potential customers to improve the efficacy of the on-line marketing effort.

47 Claims, 1 Drawing Sheet

PERSONALIZED ELECTRONIC-COMMERCE PET SHOP

CROSS-REFERENCE TO RELATED APPLICATIONS

This application claims the benefit of and priority from the U.S. provisional patent application entitled "Network Marketing Technique", having Ser. No. 60/317,527, filed Sep. 7, 2001, which is incorporated by reference in its entirety as if fully set forth herein.

BACKGROUND OF THE INVENTION

Traditional pet supply retail marketing involves displaying products available for sale in a pet store. Traditional marketing benefits by providing an emotionally personal shopping experience. It is hampered, however, by the expense and administrative difficulty inherent in displaying and stocking a large number or variety of different products, and the fact that certain items (e.g., dry pet foods) have limited shelf-life.

These shortcomings are alleviated in electronic commerce, wherein a web-site (e.g., www.pets.com) may display thousands of different items for sale, without undue expense or administrative difficulty. What the electronic commerce approach gains in thoroughness (the www.ebay.com web site has perhaps millions of different items on sale), it loses in the "personal touch" emotional experience of traditional retailing. Further, electronic commerce—and pet superstores—appear to lack the pet expertise one finds in smaller pet stores. This lack of emotional engagement and expertise reduces electronic commerce consumer loyalty vis-à-vis traditional retailing.

Retail selling (e.g., stores, catalogs, Internet, network marketing, specialty retailers, discounters, etc.) is beset with problems of customer access, market penetration, customer retention, operating costs and efficiency, personnel training and retention, inventory duplication, customer convenience, information availability, customer service, and growth. The present invention nominalizes and minimizes the effect of these problems. The TASI business model features an innovative selling and operating system it calls "Partnered Networking" ("PN"). It introduces a new distribution channel to the household customer that joins the personal touch of a field force with the efficiency and productiveness of leading edge technology. The present invention gives a company marketing capabilities that are not available with other selling systems. Customers will have convenience and service not available with other selling systems.

PN will be first applied to a receptive pet products market. Traditional retail selling displays products available for sale in pet stores (e.g., chain stores, specialty shops, discounters, etc.). Store-based retail selling offers a personal shopping experience and expertise (particularly in smaller pet shops). Customers deal face-to-face with sales agents and can see and touch what is bought. However, retail store selling is hampered by heavy startup and operating expenses, employee turnover and training, product display difficulties, geographical location, limited customer access, shelf space, shelf life, inventory duplication (e.g., multiple stores), "come-to-me" selling, and the quality of customer contact.

Electronic commerce (e.g., www.allpets.com) retains the limitations of "come-to-me" selling, but does alleviate many retail store problems. It raises convenience and expertise to higher levels and broadens product selection (e.g., e-Bay has millions of products). However, electronic commerce brings on new substantial problems (e.g., high costs of customer acquisition, advertising, branding, and delivery, etc.). Face-to-face contact is lost and the likelihood of customer loyalty is reduced.

Traditional network marketing-based retail selling significantly reduces both store and electronic commerce problems (e.g., limited customer access, operating and advertising costs, inventory duplication, customer acquisition and branding costs, customer retention, etc.). However, network marketing is operationally difficult in terms of maximizing the time spent on retail selling, managing, and training. Too much time is spent on recruitment, meetings, and administrative work. Negatives include: (a) revenues are primarily provided by sales to distributors, (b) average distributor earnings are less than expectations, and (c) distributor turnover is high.

The present invention, PN, uses technology and software applications to maximize field merchant business growth and customer control over their own buying activities. Field merchants, customers, and company operate in a 3-way "performance partnership". The main elements of PN include (a) a sales force of field merchants equipped with laptop computers, (b) mandatory field merchant training (e.g., certification, professionalization, and customer relationship enhancement), and (c) Internet-based services for marketing, selling, fulfillment, and customer satisfaction.

The present invention requires a company to provide field merchants with a variety of turnkey business services, similar to services given by franchisers to franchisees. Its growth and compensation models follow the network marketing model. However, operationally, it is significantly different. PN uses Internet mainly to support customer and field merchant services and, secondarily, as a sales generator, PN requires all software applications to be integrated (e.g., supply chain, enterprise, information, selling, customer relationship management, etc.). PN surrounds customers with face-to-face, person-to-person, and electronic (i.e., on-line) services virtually on the spot. It focuses on training, information, and education for field merchants, company employees, and customers.

BRIEF SUMMARY OF THE INVENTION

The present invention increases marketing effectiveness by identifying the best features of traditional retailing and of electronic commerce, and combining them into a system which is synergistically effective, and provides certain marketing capabilities lacking in either approach alone.

The present invention improves the effectiveness of on-line marketing by having sales representatives personally visit customers. The present invention focuses on pet supplies as an exemplary model of the present invention because pet supply shopping is an emotional and personal experience, thus pet supply electronic-commerce efforts appear highly amenable to improved personalization. However, the present invention may be used as a method of selling any products and/or services. The present invention involves linking an on-line marketing effort with a direct-sales door-to-door sales force. The present invention maximizes and optimizes marketing, selling, efficiency, cost savings, customer service, information availability, and convenience. It creates a versatile infrastructure and platform for expansive growth in multiple markets worldwide. The business model promotes decision-making, teamsmanship, performance, and strategic growth. It allows a company to manage change with timeliness, efficiency, and expertise.

DETAILED DESCRIPTION OF THE INVENTION

Figure 1:
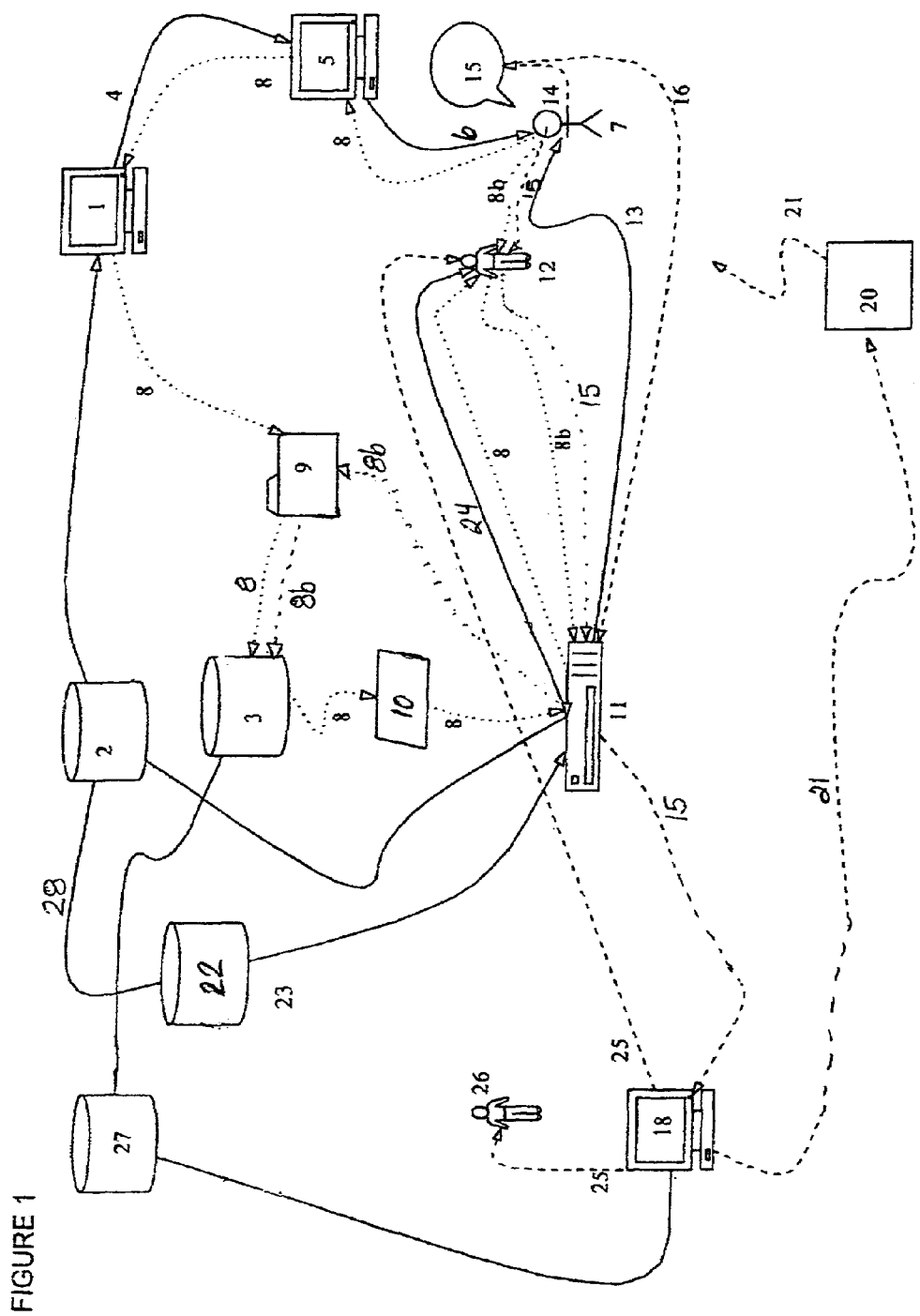
FIG. 1 provides an overview of a transaction in accordance with the present invention.

The present invention involves linking an on-line marketing effort with a direct-sales door-to-door sales force. The on-line marketing effort will be addressed first, and then the door-to-door sales force, and then how the two operate together. The present invention is a new business model and selling system. It connects a direct sales field force to the household customer face-to-face, person-to-person and electronically when and where the customer wants. The electronic ("on-line") aspect will be addressed first, then the field selling force, and lastly, how both parts work together. The present invention requires a company to operate electronically. Essentially all field merchants must be equipped with laptop computers. Selling, training, service, and supply source activities can be accomplished virtually in real time. The company can e-train field merchants live (interactively and simultaneously) or on-demand as well as monitor field merchant activities and service customers and field merchants. Field merchants can display, demonstrate and sell products instantly as well as inform and service customers. Customers can communicate with a company or its field merchants at any time using computer, phone, wireless, fax, or any other communications form.

The on-line marketing effort starts with a retail or wholesale web site. The present invention requires a website for use for wholesale and retail selling, sales support, and customer service. All sales, with the exception of certain first time sales, will be credited to field merchants. Electronically, field merchants buy from a company at wholesale and then sell at retail to customers in a unified transaction. The company fulfills the order and handles the credit and home delivery logistics.

The web site is able to access, retrieve and display product data from a catalog data structure to a potential customer. The catalog data structure stores data on the products for sale. The catalog data structure can include data on unit price, size, color, shipping cost, etc. On-line catalogs are known in the art. The web site is also able to access, retrieve, and display sales presentation data to a potential customer. Sales presentation data is stored in a sales presentation data structure. The sales presentation data defines a sales presentation for a given product being offered for sale. The presentation could be as simple as a product demonstration (e.g., a video clip of a dog eating a certain brand of dog food) or as complex as an educational piece (e.g., a lesson in parrot nutrition needs and the relative advantages of various brands of parrot feed).

As is known in the art, the web site provides a user interface or a fillable form to receive data identifying a customer, their location, and certain descriptive data relating to their shopping needs (e.g., the kind, age and number of pets they own) from the on line customer.

The present invention diverges from the art by taking that on-line customer data and relaying it to a Contract Field Merchant ("CFM") for an in-person sales call. A Contract Field Merchant is a sales representative who takes the customer data and uses it to perform an in-person sales call to the customer. The Contract Field Merchant may be paid straight salary or a salary plus commission. Preferably, the Contract Field Merchant participates in a network marketing system. In a network marketing system, a sales representative splits their sales commission with a supervisory sales manager. Network marketing is known in the art (e.g., Amway, Mary Kay Cosmetics). See generally, Market America, Inc.'s Securities & Exchange Commission Form 10-K (31 Jul. 2001). Preferably, the Contract Field Merchant will be supervised by a Contract Field Merchant Manager. The Contract Field Merchant Manager recruits the Contract Field Merchant, supervises their training program and sales efforts, and is paid a commission based on the Contract Field Merchant's sales performance.

The present invention differs from the art in that it integrates existing software applications and uses them in ways that improve the sales production of field merchants and overall service to customers. As previously mentioned, the field merchant is credited with almost all sales. All customers are assigned to field merchants on a fair basis. A field merchant is an independent contractor who inputs and uses customer data to make face-to-face, person-to-person, and online sales calls to customers or to perform a variety of service functions for customers. The field merchant buys at wholesale. He sells personally at retail and makes a 25% commission. He builds and manages a "downline" sales organization on which he is paid "referral" commissions for several levels below him based on wholesale. The company sets minimum performance standards for personal selling and downline growth. The field merchant decides when and where he works and whether he sells only personally or builds organizations.

The compensation model is similar to network marketing. Network marketing is known in the art (e.g., Amway, Mary Kay cosmetics, Avon, Excel Communications). A variation is shown by Market America. See generally, Market America Inc.'s Securities and Exchange Commission Form 10-K (31 Jul. 2001). This compensation model is preferred because it promotes geometric growth. The present invention has made changes in network marketing and franchising to create a new selling system called "Partnered Networking". It will improve sales production, field merchant earnings, operating efficiency, and customer service. It includes qualification, company-provided mandatory training, and turnkey services (e.g., selling, marketing, operating, and business).

In performing the in-person sales call, the Contract Field Merchant has a laptop computer. The laptop computer can retrieve a catalog data structure and a sales presentation data structure. These data structures can be housed locally (e.g., on the laptop computer hard disk) or may be available by network (e.g., via a wireless LAN or WAN). Wherever they are physically, the Contract Field Merchant has that data available to play to the Customer during the in-person sales call. This process of in-person delivery and presentation of computer-based marketing media may be referred to as an "Internet with legs". Whatever the terminology, it provides a much more emotionally powerful sales presentation and will generate larger sales volume per on-line customer than traditional Internet-only marketing.

The field merchant has a laptop computer that can access a variety of data structures (e.g., catalog, sales, content, service, tracking, etc.). These structures can be housed locally (e.g., on the laptop computer hard disk) or may be available by network (e.g., wireless LAN or WAN). Essentially, the field merchant has a "superstore in a laptop", operates as an "Internet with legs" (i.e., a process of delivering and presenting data to the customer at any time), and is able to bring on the spot, competent service to each customer whatever way the customer wants. Hardcopy catalogs are eliminated. The field merchant downloads catalog pages from the laptop upon customer request. This process is an emotionally powerful sales tool that should generate larger sales volume per customer than traditional Internet-only marketing and selling.

During the in-person sales call, the Contract Field Merchant inputs the customer's order into the laptop computer. That data is entered into the Order Processing Module, the software component that compiles the customer data (entered on-line or during the in-person sales call) and data on the identity and amount of goods ordered by the customer. The field merchant or other input source (e.g., telemarketer, customer service person) enters the customer's order into the laptop computer using the Order Processing Module. This software component compiles the online-provided customer and product data (e.g., who, address, product purchased, amount, delivery instructions, etc.).

The Order Processing Module verifies credit or debit card charges, processes personal checks, allocates inventory, and confirms product availability as is conventionally known in the art.

The Order Processing Module also automatically re-orders certain products. For example, a customer ordering a 50 lb. bag of a certain kind of dog food, or a certain-size sack of hamster bedding, will at some point need to buy more dog food or hamster bedding. The Order Processing Module does this automatically, by placing a series of orders for that dog food, to be delivered in the future at the customer's desired times. The Order Processing Module may do this by (i) retrieving from the catalog data structure product-specific information regarding when re-fills or re-orders of specific products (e.g., pet food) are desirable; (ii) displaying for selection and customer approval the future delivery options; and (iii) replicating or entering the order data as appropriate, using a calendar function to schedule the future deliveries.

As mentioned above, a network marketing structure is preferred for the systems of the present invention. The network marketing system, however, has been beset by several shortcomings. One shortcoming is that network marketing tends to result in sales representatives who focus less on selling product to an end-user customer, and focus more on selling the network to another potential sales representative. This is because in traditional network marketing, the sales representative has a greater potential financial reward for recruiting a new representative than for actually selling to a customer. At the extreme, such structures are similar to pyramid schemes, designed not to sell product, but to shift product from sales representative to sales representative.

To avoid such a problem it is important to provide a unique commission structure and an integrated Contract Field Merchant training program.

The commission structure known in the art of prior-art network marketing systems pays a commission recipient a commission based on both (i) the commission recipient's own retail sales of product and (ii) retail sales of product made not by the commission recipient directly, but indirectly, by sales representatives recruited by the commission recipient (i.e., "downstream" sales). Prior-art network marketing systems are structured so that the commission recipient has a greater potential financial payoff from downstream sales than from direct sales to end-users. That kind of network marketing system suffers from the problem of sales representatives devoting their time to recruiting new sales representatives, rather than actually selling product to an end-user consumer. In contrast to the prior art, the commission structure of the present invention differs in rewarding retail sales with a relatively high retail sales commission—preferably combined with a retail-sales based bonus—while rewarding downstream sales only nominally. Thus, preferably, a commission of approximately 25% of retail sales value, for direct sales to end-users, and a commission of approximately 5% for downstream sales for retail sales by Contract Field Merchants one step removed from the commission recipient, and a nominal commission of approximately 1% for retail sales more than one step removed from the commission recipient.

Prior art network marketing systems also generally require their sales representatives to purchase their own personal inventory of product. In prior art network marketing systems by Mary Kay cosmetics, Discovery Toys, Shaklee, Sunrider, USANA and Herbalife, purchases by sales representatives account for over 70% of company revenues. This financially encourages sales representatives to devote their energy to recruiting other sales representatives and selling them inventory, rather than making retail sales to end-users. The present invention differs from the prior art in not requiring a Contract Field Merchant to purchase inventory of product. This keeps a Contract Field Merchant focused on the task of retail sales to end-users, rather than "wholesale" sales to other sales representatives.

In addition to the commission structure, each CFM is preferably graded based not only on their downstream sales, but on their own direct two month average retail sales. Thus, for example, one can classify a CFM as regular, Senior, Executive and Senior Executive, based on the dollar amount of personal monthly retail sales.

In addition to a novel commission structure, the present invention preferably includes a Contract Field Merchant training program. The Contract Field Merchant training program provides to each Contract Field Merchant (and to each Contract Field Merchant Manager) an Organization Learning training program. The Organization Learning training program trains each Contract Field Merchant on the products offered for sale, time management, network marketing systems, recruiting, customer relationships, sales organization management, tax/finance/accounting/business issues, the unique business model of the present invention, the management and development of a Contract Field Merchant and of a Contract Field Merchant Manager, marketing theory and practice, sales skills and macro and micro coverage of selling, marketing, computer equipment/software/Internet use, customer service and expert information (e.g., early warning signs for disease in fresh water fish, proper exercise for puppies, etc.). Preferably, each Contract Field Merchant is tested and certified upon completion of a particular training module.

In addition, each CFM Manager is preferably trained in values-based management and certain human-resources matters, web mastering, marketing, technology, customer service and order fulfillment.

Preferably, the Organization Learning training program will be provided in two components: an on-line component, which may be completed when each Contract Field Merchant finds it most convenient, and a "live" component, requiring attendance by the Contract Field Merchant at pre-designated times. Web-based on-demand training is known in the art (such as that commercially available from Caliber Learning Systems Inc.).

The Organization Learning training program includes about thirty hours of training when a new Contract Field Merchant is hired, and two 4-hour modules are to be completed each month thereafter. Preferably, the live component includes the capacity for each Contract Field Merchant to pose questions, preferably without interrupting the flow of the main speaker's presentation. This may be done, for example, by hosting an on-line training session where each Contract Field Merchant can send e-mail questions to an expert for response during the on-line presentation. Over the long term, it is anticipated that this training program will reduce Contract Field Merchant turnover, and keep sales to customers (rather than recruitment of new sales representatives) the priority.

As mentioned above, the present invention includes changes in network marketing and franchising. The present invention incorporates the turnkey service attributes of franchising, the geometric growth of network marketing and Internet, and the targeted support of traditional marketing. Partnered Networking removes the operational limitations of network marketing. It can deliver consumer products most cost effectively from the manufacturer to the customer, build a professional base of more financially secure field merchants, and create highly sustainable household ties, allowing for continually expanding growth in multiple worldwide markets.

Turnkey services include, but are not limited to, training, personal websites, sales-marketing support, promotional events, product selection, general and expert informational content, fulfillment, merchandising, customer service and relationship management, and consumer research. Other such services include, but are not limited to, lead and customer referrals, business monitoring, mentoring and coaching of selling and marketing activities, and general business and tax information. Franchising is known in its art form to require franchise acquisition fees, royalty fees based on sales revenues, advertising fees, and limited selling territory. Partnered Networking does not limit a field merchant's selling territory. Its fees are limited to a one-time registration fee (20-30 hours of initial training, a manual, and sales support materials) and a reasonable, mandatory monthly business services fee (1-4 hours of new training, lead and customer referrals, website maintenance, and support marketing and promotion).

The geometric nature of network marketing lets a distributor make substantially more money from the sales of his downline selling organization (e.g., earning 1% on the sales of a large number of downline distributors going down several levels) than he can from his personal retail sales (e.g., earning 25%). Prior art network marketing companies have emphasized this fact, and recruitment has been distributors' prevailing business activity. Some companies have taken this approach to the extreme and have created illegal pyramid schemes that pay mainly for recruiting success rather than product selling. Such approach conflicts with sound business practices and has created several substantial operating defects, which the present invention, PN, overcomes:

Too little time is spent on selling products and training.
    Too much time is spent on recruiting and attending unproductive non-sales oriented meetings
        Distributors spend approximately:
            1. 45% of time selling products—PN field merchants should spend about 65%.
            2. 19% of time recruiting new distributors—PN field merchants should spend about 15%.
            3. 25% of time doing paperwork, attending meetings—PN field merchants should spend about 10%.
            4. Nominal time training—PN field merchants should spend about 5%.
    Too little effort is spent building a base of repeat customers and a sound downline selling organization
    Too much emphasis on inventory purchasing—PN field merchants need not keep an inventory or warehouse.

The present invention sets out a sales-support partnership between a company and its field selling force. Field merchants sell at retail and build and manage downline sales organizations. The company provides field merchants with diverse turnkey services to the extent needed by field merchants to build their businesses. The present invention adopts the commission structure of prior art network marketing companies. However, it has added new, operationally protective requirements for field merchants to fulfill. For instance, it sets an absolute minimum of non-field merchant customers that field merchants must add each month. The invention requires a broad base of initial field merchants. This approach protects a company from being controlled by a few, successful downline sales organizations. Further, it allows a company to stress sound business building fundamentals (i.e., build residual business through retail selling and build downline sales organizations slowly). Benefits include:

1. Company revenues from non-field merchant customers should surpass, over time, 80% of all product revenues.
2. Field merchants will be "true examples" of how sales are made and downline organizations are built.
3. Residual business will be significant, increasing field merchant earnings and reducing field merchant turnover.

Another new operationally protective requirement is training prior to the start of selling and, thereafter, mandatory monthly training conducted live (e.g., interactively and simultaneously). Interactive e-training will allow direct inquiry to the presenter as well as "offline" e-mail inquiry to connected experts without interrupting the presenter. Except for the initial group of field merchants, field merchants will be primarily e-trained. Testing will be included; company certification will be motivated.

Benefits include:

1. A professional field selling force will increase sales and accelerate new market entry. Field merchants will receive macro and micro training in such subjects as, but not limited to, sales, marketing, time management, recruiting, customer relationships, customer service, sales organization management, tax-finance-accounting-business issues, laptop computer and software usage, Internet usage, product information. Each new field merchant will receive 30-40 hours of pre-selling training. Each month thereafter, each field merchant will receive 1-4 hours of new training. Prior training sessions will be available online on-demand.
2. The field selling force will attract alliance partners wanting to build brand name and increase market share.
3. Field merchant earnings will increase and the rate of retention will be higher.

A third operationally protective requirement is mandatory laptop computers. Benefits:

1. A company maximizes operating response times, customer service, and its ability to lead competition.
2. A company controls training quality—timing, content, accuracy, and presentation.
3. A company monitors field merchant activities on an "as it occurs" basis, giving it unprecedented immediate knowledge of sales performance and permitting the highest level of financial planning practices.
4. A company provides electronic guidance to field merchants.

5. A company works with "upline" field merchants to mentor and coach downline field merchants.
6. Field merchants can operate their businesses anywhere in the world, efficiently and more productively.
7. Field merchants become "superstores in a laptop", product demonstrators, and customer relationship specialists.
8. Field merchants give customers instant, competent service whenever and wherever customers want.
9. Field merchants will train whenever and wherever they want-online, live or on-demand.
10. Field merchants will introduce new products, grow sales, and brand products rapidly at low cost.
11. Laptops optimize the care and support given to field merchants and customers resulting in lower turnover and added sales.

An advantage of the present invention is that it does not require an inordinate amount of programming effort; rather, it can be executed largely using off-the shelf, commercially available software and hardware. An advantage of the present invention is that it uses commercially available software and hardware ("shelf" products) and thus, requires little programming. Applications that will be integrated include, but are not limited to, supply chain, enterprise, information, customer relationship management, training, human resources, accounting and finance, sales and sales management, network marketing, and security. For example, the Contract Field Merchant laptop computer system required can be made using Dell INSPIRON® S000e laptop computers (commercially available from Dell Computer Corp., Dallas Tex.) loaded with the WINDOWS® 2000 operating system and INTERNET EXPLORER® web browser (each commercially available from Microsoft Corp., Redmond Wash.). These laptop computers communicate with data structures stored on a NETSERVER® 1h 6000 (commercially available from Hewlett-Packard Corp., Palo Alto Calif.) running the HPUX® Unix 98® server operating system (commercially available from Hewlett-Packard Corp., Palo Alto Calif.), SAS IT SERVICE VISION® server and network performance-management software, ORACLE 9i® relational database (data structure) software (commercially available from Oracle Computer Corp., Redwood City Calif.) and the Novell NETWARE® local area operating system (commercially available from Novell Corp., Provo Utah). Printers can be LASERJET®4050N laser printers or DESKJET® printers (each commercially available from Hewlett-Packard Corp., Palo Alto Calif.); ERP Software—such as PEOPLESOFT®; CRM software such as that commercially available from Siebel Systems; E-commerce software such as that commercially available from Broadvision Technologies Corp.; Multi-Level Marketing software such as that commercially available from Jenkon Systems Inc.; a knowledge-management system such as SAS ENTERPRISE MINER®; data warehouse software such as that commercially available from Oracle Systems Inc.; report writer and query software such as that commercially available from Oracle Systems Inc.; e-mail and groupware software, such as LOTUS® NOTES® commercially available from Lotus Development Corporation (Cambridge, Mass.); inventory transportation/shipping software, such as that commercially available from Manugistics Corp.; and e-marketing software such as that commercially available from e.piphany Corp.

At the macro company level, the present invention gives a company instantaneous knowledge of its financial position—a benefit of untold significance. This results from the laptop computer connection that feeds all integrated systems with current data as it occurs. It gives instantaneous access to all retail selling sources. This optimizes the benefits of rapid communication in terms of sales, operations, change, service, and training. It gives instantaneous access to the supply chain and service providers. The invention promotes maximum efficiency, cost savings, and performance.

Principal operational aspects of the present invention are described by activity: The administrative activities of a field merchant ("FM") include: (i) qualify, (ii) register, (iii) assigned to sponsor, (iv) receive laptop, (v) trained and tested by sponsor and company before or simultaneously with his selling, (vi) create initial selling plan with sponsor (must meet company's minimum performance goals), (vii) input selling plan into laptop (accessible by sponsor and company), (viii) performance is electronically monitored by sponsor/company, (ix) electronically input new plan each month, (x) undergo mandatory monthly electronic training (his choice of live/on-demand), (xi) electronically provide sponsor/company daily information on leads, calls, personal contacts, new customers, new down-line fin registrations, sales, events, etc., and (xii) receive mentoring and coaching, electronically or in-person, from sponsor/company. Training, whether for ten or tens of thousands field merchants, will be conducted simultaneously and will be company controlled, at nominal cost and optimized effectiveness.

The selling activities of an FM include: (i) bring store to the customer, (ii) give customers on the spot service, (iii) transact all sales activities electronically (sales information flows to company, vendor, and warehouse simultaneously for real-time adjustments to inventory, warehousing, and manufacturing requirements), (iv) introduce new products face-to-face (company introduces new products electronically), (v) is a face-to-face customer relationship specialist (company electronically and telephonically performs customer service), (vi) conduct face-to-face market research (company conducts electronic market research), (vii) maintain a personal website (company provides and electronically maintains), (viii) develop leads and customers (company supplements), (ix) market and advertise locally (company supports), (x) conduct "events" (company supports), and (xi) earn whether customer buys through him or directly from company. An FM's laptop contains product catalog, product information, price comparisons, product demonstrations, expert information, general information, questions & answers, chat rooms (community), e-mail, etc.

The customer has ultimate control over buying and service (e.g., the customer can order at 2 am, may be a recluse, and may never see his field merchant). The customer's convenience is maximized (e.g., the store is brought to the customer when and where wanted, whether face-to-face, in-person, or electronically. The customer has access to anytime ordering, home delivery, and selected delivery dates). Service is optimized (e.g., competent, on the spot), extensive content is provided (e.g., product, demonstrations, comparisons, expert access, community), the customer is surrounded with human and electronic service which makes 360 degree service and customer-centric descriptions factual.

FIG. 1 shows an example of a transaction executed according to the system of the present invention. A server computer [1] hosts an Internet web site. The server computer makes available on the web site, data from a catalog data structure [2] such as a product catalog data structure. The catalog data structure [2] stores information on each of the plurality of items offered for sale. Such information typically includes price, size, color, etc. It may also include what one might consider as "product technical information". For example, for parakeet feed, the catalog data structure might include information on the kinds of parakeets the feed is suited for, how to feed parakeets, what health issues a change in parakeet eating behavior may indicate, etc. The data from the catalog data structure [2] is thus made available on the server, viewable on the web page and accessible [4] via a computer network (such as the Internet), so the web page may be downloaded to a personal computer [5] and reviewed [6] by a potential customer [7].

The potential customer [7], in finding of interest the products offered for sale on the web site, then inputs customer data [8]. Such information may include information identifying the potential customer, their location, and perhaps information regarding their possible product needs (e.g., the number, age and kind of pets they own). This customer data [8] is transferred from the customer's personal computer [5] to the server computer [1] where it is used to create an electronic file [9] or data structure entry in a customer information data structure [3]. The customer information data structure [9] may contain information on a plurality of potential customers [9] and actual customers, perhaps customers who are scattered across the globe.

The plurality of electronic files [9] containing information on the various customers is then sorted geographically [10]. Customer data [8] on the potential customer [7] is downloaded to the portable computer [11] assigned to the Contract Field Merchant with responsibility for making in-person sales calls in the potential customer's [7] geographic area.

Retrieving the customer data [8], the responsible Contract Field Merchant then makes an in-person sales call to the potential customer [7]. The in-person sales call can include viewing [13] on the portable computer [1] a promotional/advertising presentation. Preferably, such promotional presentations are stored on the catalog data structure [2] and are accessible (4) for viewing over the web via server computer [1] on the potential customer's [7] personal computer [5] as well as being downloadable onto portable computer [11] for in-person viewing [13] with the CFM [12] during the in-person sales call.

Alternatively, the CFM [12] can simply "cold call" the prospective customer [7], without receiving any customer data [8] from the prospective customer [7] prior to the "cold call". This approach is particularly valuable with products like pet products, for which many of the consumers are not heavy Internet users, and in fact many use the Internet sparingly or not at all. In this alternative, the CFM [12] cold calls the potential customer [7], who then provides to the CFM [12] the in-person customer data [8b] during the in-person sales call. The in-person customer data [8b] is entered into the portable computer [11], and then transferred to make an electronic file [9] or database record for the potential customer [7] in the customer information data structure [3].

In a successful sales call, the potential customer [7] will agree [14] to placing a purchase order [15]. The purchase order [15], defined by purchase data, will be entered into the portable computer [11] by the potential customer [7] or CFM [12]. From the portable computer [11], this purchase data is transferred as a purchase order [15] to an order fulfillment computer [18]. The order fulfillment computer [18] then arranges billing and shipping of the purchase order [15]. Using any desirable delivery method (e.g., ground or air shipping), the product [20] is delivered [21] to the potential customer [7]. For a product with a defined lifespan, or defined re-order interval, the purchase order [15] may in fact be comprised of several purchase orders, each executable at a certain time interval. For example, for a potential customer [7] ordering a 50 lb. bag of dog food, the purchase order [15] could specify that one bag be delivered [21] to the potential customer [7] on the first day of every calendar month.

Also available on the portable computer [11] are various training programs stored in the training program data structure [22] and downloaded [23] to the portable computer [11] and played [24] on-demand to the CFM, to fulfill the training requirements discussed above. To the extent such training involves product-specific presentations, it is useful for the training program data structure to directly or indirectly communicate with [28] the catalog data structure [2], so that such product-specific presentations can be easily included in the training program.

Preferably, sales commissions [25] are calculated automatically by the order fulfillment computer [18]. The preferred formula for calculating sales commissions is discussed above. The order fulfillment computer [18] accordingly calculates and distributes (or credits) the sales commission [25] due the Contract Field Merchant [12] directly responsible for the retail sale, as well as any sales commission [25] due a Contract Field Merchant Manager [26] entitled to an upstream commission.

Preferably, the order fulfillment computer [18] runs multi-level sales software (occasionally referred to as the "MLM Module" in the parent provisional patent application). The multi-level sales software contains the "Genealogy Structure" (the relationship of each CFM to their respective CFM Manager, which relationship serves as variable input in the commission calculation algorithm) and the CFM and CFM Manager commission algorithm. Preferably, this software is able to interface with a third-party payroll service (such as that commercially available from ADP Corporation of Roseland N.J.) to facilitate the generation and distribution of paychecks with correct sales commissions included therein. Preferably, the order fulfillment computer [18] also has a CFM data structure [27] including information on each CFM. By relating the CFM data structure [27] to the customer information data structure [3], reports detailing CFM profitability and productivity are easily output.

Preferably, the order fulfillment computer also includes the following software modules, each commercially-available from various vendors:

A Purchasing Module, to support standard purchase orders with standard terms and conditions, multiple items from multiple vendors on purchase requests, systems requests and hand-generated purchase requests, purchase order status tracking, vendor rating, small and minority vendor reporting, back order tracking, returns, and 3-way compared close out.

A Receiving Module supporting product inventory and office miscellaneous inventory. The receiving module supports excess receipts, customer returns, short orders, order review, tracking/processing and purchase order and invoice cross-checking.

An Inventory Module supporting multiple warehouses, multiple sub-warehouses with one location, and manufacturer direct-shipping. The Inventory Module handles daily cycle counting, periodic physical inventories, back orders and customer returns. Inventory obsolescence and perishable inventory is tracked where appropriate (e.g., dry pet food). Reorders reflect minimum inventory levels by product SKU, on MRP-generated orders, or both. Preferably, all SKUs are bar coded, and pick-and-pack machines are compatible with the Inventory Module.

A Shipping Module executes all modes of shipping, allows for multiple boxes for one order, multiple items per box, and multiple orders in one box. The Shipping Module interfaces with labeling equipment to prepare labeling.

These modules are commercially available, and the selection of one or another specific brand is a matter of simple convenience.

Thus, as can be seen from FIG. 1, an aspect of the present invention is an improvement to a system of electronic commerce comprising providing a Contract Field Merchant with a portable computer able to (i) access and retrieve product data from a catalog data structure storing data on a plurality of products for sale, (ii) access and retrieve sales presentation data from a sales presentation data structure storing data defining a sales presentation, and (iii) communicate purchase data to an Order Processing Module, in which the Contract Field Merchant provides to a customer a sales call (in-person (e.g., telephonic), face-to-face or via a personal web site) comprising: presenting to the customer a sales presentation stored on the sales presentation data structure and at least some of the data stored in the catalog data structure; and inputting into an Order Processing Module order data comprising (i) customer data identifying the identity and location of the customer, and (ii) purchase data defining an order to purchase at least one of the products for sale. Another aspect of the present invention is this improvement; further comprising remunerating a Contract Field Merchant Manager based on the purchase data, as part of a partnered networking system. Another aspect of the present invention is this improvement, further comprising shipping to the customer the purchased product on a plurality of (sometimes regularly scheduled) occasions. Another aspect of the present invention is this improvement, further comprising providing a web site able to (1) access and retrieve (a) product data from a catalog data structure storing data on a plurality of products for sale; and (b) sales presentation data from a sales presentation data structure storing data defining a sales presentation; and (2) receive from an on-line customer, customer data identifying the identity and location of the customer, and sending the customer data to the Contract Field Merchant. Another aspect of the present invention is this improvement, further comprising providing to said Contract Field Merchant an Organization Learning training program. The training for Contract Field Merchants is available live, interactively, simultaneously and on-demand, with the message, its timing, accuracy, presentations, audience, etc. controlled by the company.

The example illustrated herein is for ease of understanding and reference only; the legal coverage of this patent is defined not by the example illustrated, but by the appended claims and their equivalents; on studying this disclosure, other versions or embodiments of my system will become apparent to those of skill in the art. While one aspect of the disclosure of the parent provisional application is claimed herein, it is claimed herein without prejudice to claim at a later time other aspects of that disclosure. Claim terms written in the singular ("a," "one" or "an") specification.

I claim:

1. A method for selling one or more products to at least one consumer via a business entity comprising:
    offering said products to said at least one consumer via at least one product Web site of an Internet;
    affiliating said business entity with at least one primary field merchant wherein said at least one primary field merchant directly sells said products to said at least one consumer;
    providing a franchise to each of said at least one primary field merchants; and
    equipping said at least one primary field merchant with at least one portable device for connecting said at least one primary field merchant to said Internet via at least one Internet connection,
    wherein said direct selling is selected from the group consisting of door-to-door sales, network marketing sales, multi-level sales, and combinations thereof, and said method further comprising individual and simultaneous training to at least one primary field merchant, or a plurality thereof, via said Internet connection by displaying to at least one of group consisting of live, on-demand, interactive training sessions or combinations thereof.

2. A method according to claim 1, wherein said Internet connection allows said at least one primary field merchant to provide said at least one consumer with immediate order entry and real-time product information.

3. A method according to claim 2, wherein said real-time product information includes at least one of the group consisting of sales brochures, sales presentations, product presentations, educational presentations, rebate offers, coupons, sale information, data regarding availability of said product desired by said consumer, data regarding location of said product desired by said consumer, price of said product, size of said product, available colors of said product, shipping costs of said products, and combinations thereof.

4. A method according to claim 2, wherein said order entry includes entry of repetitive orders to be delivered to said consumer upon dates requested in advance by said consumer.

5. A method according to claim 1, wherein said franchise includes at least one of the group consisting of information regarding at least a portion of said at least one consumer, at least one primary field merchant Web site, sales training and tools, marketing training and tools, promotional events, customer service training and tools, consumer research, sales leads, customer referrals, business monitoring, mentoring, coaching, general business training and tools, general tax training and tools, time management training and tools, recruiting training and tools, sales organization management training and tools, accounting training and tools, computer training and tools, software training and tools, training and tools for use of said Internet, supply chain training and tools, enterprise resource planning training and tools, electronic commerce training and tools, customer relationship management training and tools, human resource training and tools, multi-level marketing training and tools, security training and tools, knowledge management training and tools, data warehouse training and tools, report writer and query training and tools, electronic mail and groupware training and tools, inventory transportation training and tools, electronic marketing training and tools, and combinations thereof.

6. A method according to claim 1, wherein said at least one primary field merchant is equipped with at least one sample of said products for in person display to said at least one consumer.

7. A method according to claim 1, said method further comprising:
    affiliating said business entity with at least one manufacturer wherein said at least one manufacturer supplies at least one of said products directly to said at least one consumer upon order of said at least one product via at least one of the group consisting of entry of said order by said at least one consumer via said at least one product Web Site, entry of said order by said at least one primary field merchant via said Internet connection, and combinations thereof.

8. A method according to claim 1, wherein said Internet connection provides information regarding said consumers to said at least one primary field merchant via said portable device.

9. A method according to claim 1, said method further comprising:
monitoring said at least one primary field merchant via said Internet connection by accessing data included in said portable device.

10. A method according to claim 9, wherein said monitoring is real-time.

11. A method according to claim 9, said method further comprising:
uploading said data to at least one server;
wherein said uploaded data provides said business entity with instantaneous knowledge of its financial position.

12. A method according to claim 1, said method further comprising:
servicing said at least one consumer via said at least one product Web Site.

13. A method according to claim 1, said method further comprising:
servicing of said at least one consumer by said at least one primary field merchant via at least one of the group consisting of said at least one product Web Site, said Internet connection, said portable device, and combinations thereof.

14. A method according to claim 1, said method further comprising:
distributing information regarding at least a portion of said at least one consumer to said at least one primary field merchant;
wherein said information is collected via said at least one product Web site.

15. A method according to claim 14, wherein said at least one primary field merchant services said at least one consumer for which said information is received by said primary field merchant.

16. A method according to claim 15, wherein said servicing includes at least one of the group consisting of an in-person meeting, an online meeting, and combinations thereof.

17. A method according to claim 1, further comprising:
recruiting of at least one secondary field merchant by said at least one primary field merchant;
wherein said at least one primary field merchant performs at least one of the group consisting of developing said secondary field merchant, managing sales activity of said at least one secondary field merchant, monitoring said at least one secondary field merchant, and combinations thereof.

18. A method according to claim 17,
wherein said at least one secondary field merchant is equipped with at least one of said portable devices; and
wherein said at least one portable device connects said at least one secondary field merchant to said Internet via said at least one Internet connection.

19. A method according to claim 1, wherein said at least one primary field merchant is an independent contractor of said business entity.

20. A method according to claim 1, wherein said Internet connection interconnects at least one of the group consisting of purchasing functions, selling functions, order fulfillment functions, shipping functions, operational functions, and combinations thereof in real-time.

21. A system for selling one or more products to at least one consumer via a business entity comprising:
at least one server coupled to an Internet for hosting at least one product Web site of said Internet for purchase of said products by said at least one consumer;
at least one portable device coupled to said at least one server via at least one Internet connection for connecting at least one primary field merchant to said Internet via at least one Internet connection;
wherein said at least one primary field merchant directly sells said products to said at least one consumer;
wherein said direct selling is selected from the group consisting of door-to-door sales, network marketing sales, multi-level sales, and combinations thereof; and
wherein said business entity provides a franchise to each of said at least one primary field merchants and said system further comprising individual and simultaneous training to at least one primary field merchant, or a plurality thereof, via said Internet connection by displaying to at least one of group consisting of live, on-demand, interactive training sessions or combinations thereof.

22. A system according to claim 21, wherein said Internet connection allows said at least one primary field merchant to provide said at least one consumer with immediate order entry and real-time product information.

23. A system according to claim 22, wherein said real-time product information includes at least one of the group consisting of sales brochures, sales presentations, product presentations, educational presentations, rebate offers, coupons, sale information, data regarding availability of said product desired by said consumer, data regarding location of said product desired by said consumer, price of said product, size of said product, available colors of said product, shipping costs of said products, and combinations thereof.

24. A system according to claim 22, wherein said order entry includes entry of repetitive orders to be delivered to said consumer upon dates requested in advance by said consumer.

25. A system according to claim 21, wherein said franchise includes access by said at least one field merchant to at least one of the group consisting of supply chain software, enterprise resource planning software, electronic commerce software, customer relationship management software, training software, human resource software, accounting software, sales software, multi-level marketing software, security software, knowledge management software, data warehouse software, report writer and query software, electronic mail and groupware software, inventory transportation software, electronic marketing software, and combinations thereof.

26. A system according to claim 25, wherein said access is via said portable device.

27. A system according to claim 25,
wherein said at least one consumer inputs personal data into said product Web site; and
wherein said personal data of said at least one consumer is distributed to at least one of said primary field merchants.

28. A system according to claim 27, wherein said at least one primary field merchant services said at least one consumer for which said personal data is received by said at least one primary field merchant.

29. A system according to claim 25, said system further comprising:
at least one order fulfillment computer for receiving an order for said product and initiating at least one of the group consisting of billing, shipment, and combinations thereof for said order.

30. A system according to claim 29,
wherein said order is entered into said portable device by at least one of the group consisting of said primary field merchant, said consumer, and combinations thereof; and
wherein said order is transferred to said order fulfillment computer via said Internet connection.

31. A system according to claim 29, wherein said order fulfillment computer automatically calculates a sales commission for said primary field merchant responsible for placing a respective one of said orders.

32. A system according to claim 29, wherein said order fulfillment computer is integral to said server.

33. A system according to claim 21, wherein said at least one primary field merchant is equipped with at least one sample of said products for in person display to said at least one consumer.

34. A system according to claim 21, wherein at least one manufacturer supplies at least one of said products directly to said at least one consumer upon order of said at least one product via at least one of the group consisting of entry of said order by said at least one consumer via said at least one product Web Site, entry of said order by said at least one primary field merchant via said Internet connection, and combinations thereof.

35. A system according to claim 21, wherein said at least one primary field merchant is trained via said Internet connection by displaying at least one of the group consisting of on-demand training sessions, live training sessions, and combinations thereof.

36. A system according to claim 35, wherein said at least one of the group consisting of said on-demand training sessions, said live training sessions, and combinations thereof is interactive.

37. A method according to claim 35, wherein said training is performed simultaneously for a plurality of said at least one primary field merchants.

38. A system according to claim 37, wherein said monitoring is real-time.

39. A system according to claim 21, wherein said at least one primary field merchant is monitored by said business entity via said Internet connection by accessing data included in said portable device.

40. A system according to claim 39,
wherein said data is uploaded to said at least one server; and
wherein said uploaded data provides said business entity with instantaneous knowledge of its financial position.

41. A system according to claim 21, wherein said at least one consumer is serviced via said at least one product Web Site.

42. A system according to claim 41, wherein said servicing includes at least one of the group consisting of an in-person meeting, an online meeting, and combinations thereof.

43. A system according to claim 21, wherein said at least one primary field merchant services said at least one consumer via said at least one of the group consisting of said at least one product Web Site, said Internet connection, said portable device, and combinations thereof.

44. A system according to claim 21,
wherein said at least one primary field merchant recruits at least one secondary field merchant; and
wherein said at least one primary field merchant performs at least one of the group consisting of developing said secondary field merchant, managing sales activity of said at least one secondary field merchant, monitoring said at least one secondary field merchant, and combinations thereof.

45. A system according to claim 44,
wherein said at least one secondary field merchant is equipped with at least one of said portable devices; and
wherein said at least one portable device connects said at least one secondary field merchant to said Internet via said at least one Internet connection.

46. A system according to claim 21, wherein said at least one primary field merchant is an independent contractor of said business entity.

47. A system according to claim 21, wherein said Internet connection interconnects at least one of the group consisting of purchasing functions, selling functions, order fulfillment functions, shipping functions, operational functions, and combinations thereof in real-time.

* * * * *